(12) United States Patent
Byron, Jr. et al.

(10) Patent No.: US 6,576,097 B2
(45) Date of Patent: Jun. 10, 2003

(54) REACTANT SOURCE FOR AN ELECTROLYSIS CELL

(75) Inventors: Robert H. Byron, Jr., Glastonbury, CT (US); Audrey A. McManus, Windsor, CT (US); Ricky S. Scott, Clinton, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 19 days.

(21) Appl. No.: 09/908,484

(22) Filed: Jul. 18, 2001

(65) Prior Publication Data

US 2002/0023835 A1 Feb. 28, 2002

Related U.S. Application Data

(60) Provisional application No. 60/219,536, filed on Jul. 20, 2000.

(51) Int. Cl.[7] .................................................. C25B 9/00
(52) U.S. Cl. ............................... 204/264; 204/275.1
(58) Field of Search .......................... 204/275.1, 276, 204/263, 264, 265, 266, 253–258, 279, 271

(56) References Cited

U.S. PATENT DOCUMENTS

| | | | |
|---|---|---|---|
| 691,545 A | 12/1902 | Holland | |
| 3,223,242 A | * 12/1965 | Murray | 204/266 X |
| 3,405,050 A | 10/1968 | Bovard et al. | |
| 3,767,558 A | * 10/1973 | Rowe | 204/263 X |
| 4,061,556 A | * 12/1977 | Reis et al. | 204/271 |
| 4,290,873 A | * 9/1981 | Weaver | 204/266 X |
| 4,724,059 A | * 2/1988 | Collier | 204/266 X |
| 5,053,114 A | * 10/1991 | Maddock | 204/252 |
| 5,643,425 A | * 7/1997 | Amano et al. | 204/279 |
| 5,989,407 A | 11/1999 | Andrews et al. | 205/626 |
| 6,083,392 A | * 7/2000 | Rigney | 210/451 |

FOREIGN PATENT DOCUMENTS

| | | |
|---|---|---|
| EP | 0 339 187 A | 11/1989 |
| FR | 817 703 A | 9/1937 |

OTHER PUBLICATIONS

International Search Report, International Application No. PCT/US 01/22497, International Filing Date Jul. 18, 2001, Date of Mailing Jun. 18, 2002, 9 pages.

* cited by examiner

*Primary Examiner*—Donald R. Valentine
(74) *Attorney, Agent, or Firm*—Cantor Colburn LLP

(57) ABSTRACT

A reactant source for an electrolysis cell includes a vessel configured to contain water, a funnel disposed in integrated communication with the vessel, and a door disposed over the funnel. The door may be slidably or pivotally mounted over the funnel and is configured to prevent the introduction of an object into the funnel.

13 Claims, 7 Drawing Sheets

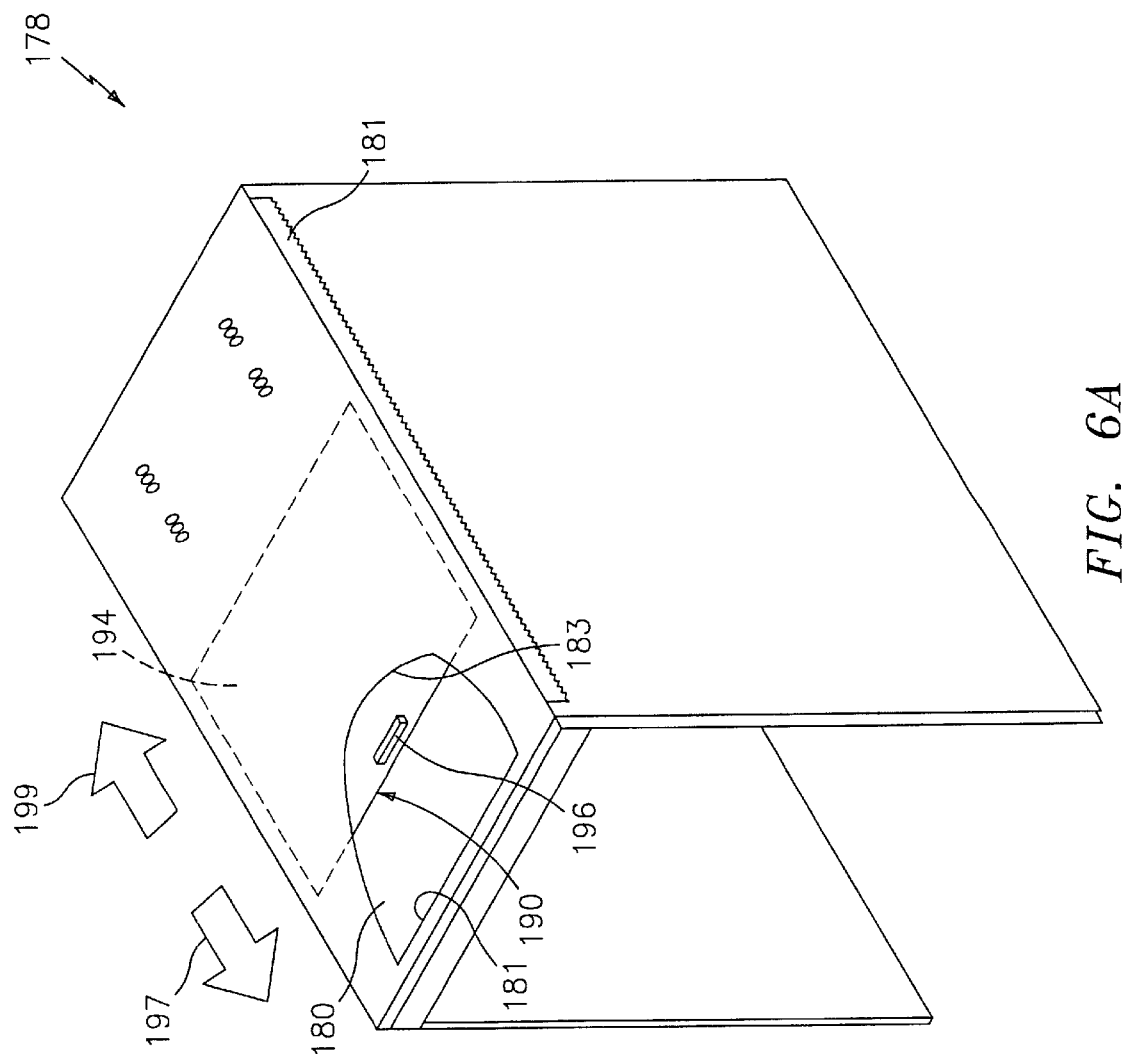

REACTANT SOURCE FOR AN ELECTROLYSIS CELL

CROSS REFERENCE TO RELATED APPLICATION

This application claims the benefit of U.S. Provisional Patent Application Serial No. 60/219,536 filed Jul. 20, 2000, the entire content of which is incorporated herein by reference.

BACKGROUND

The present disclosure relates to electrochemical cells, and in particular to the reactant source for electrolysis or regenerative fuel cell systems.

Electrochemical cells are energy conversion devices, usually classified as either electrolysis cells or fuel cells. Proton exchange membrane electrolysis cells can function as hydrogen generators by electrolytically decomposing water to produce hydrogen and oxygen gases. Referring to FIG. 1, a section of an anode feed electrolysis cell of the prior art is shown generally at 10 and is hereinafter referred to as "cell 10." Reactant water 12 is fed into cell 10 at an oxygen electrode (anode) 14 to form oxygen gas 16, electrons, and hydrogen ions (protons) 15. The chemical reaction is facilitated by the positive terminal of a power source 18 connected to anode 14 and the negative terminal of power source 18 connected to a hydrogen electrode (cathode) 20. Oxygen gas 16 and a first portion 22 of the water are discharged from cell 10, while protons 15 and a second portion 24 of the water migrate across a proton exchange membrane 26 to cathode 20. At cathode 20, hydrogen gas 28 is removed, generally through a gas delivery line. The removed hydrogen gas 28 is usable in a myriad of different applications. Second portion 24 of water is also removed from cathode 20.

Electrochemical cell systems typically include a number of individual cells arranged in a stack, with the working fluids (e.g., reactant water 12) directed through the cells via input and output conduits formed within the stack structure. The cells within the stack are sequentially arranged, each including a cathode, a proton exchange membrane, and an anode (hereinafter "membrane electrode assembly", or "MEA"). Each cell typically further comprises a first flow field in fluid communication with the cathode and a second flow field in fluid communication with the anode. The MEA may be supported on either or both sides by screen packs or bipolar plates disposed within the flow fields, and which may be configured to facilitate membrane hydration and/or fluid movement to and from the MEA.

The reactant water used as the fuel in the cell is deionized, distilled water, which is stored in a reservoir that is in fluid communication with the cell stack. The fill port of the vessel is a hole through which the water is poured. Problems associated with such a design include the inadvertent pouring of water onto other components of the cell as the water reservoir is being filled. The water reservoir also includes a screw cap or pull-off cap covering the fill port. Problems associated with such a design include the contamination of the water with dust or particulate matter introduced during the removal of the screw cap. Furthermore, vessels of the prior art tend not to have any protective member between the opening and the water level in the vessel. In the absence of such a protective member, dust or particulate matter can be easily introduced into the vessel by water splashing off the sides of the fill port and top of the cell, thereby contaminating the water and adversely affecting the performance of the cell.

SUMMARY

A reactant source for an electrolysis cell is disclosed. The water source includes a vessel portion configured to contain water, a funnel disposed in integrated communication with the vessel portion, and a door disposed over the funnel. The door is configured to prevent the introduction of an object into the funnel. A deionizer container may be present in the water source.

In another embodiment, a gas generating system comprises an electrolysis cell; an electrical source disposed in communication with said electrolysis cell; and a reactant source disposed in communication with said electrolysis cell, wherein the reactant source comprises a vessel, a funnel disposed in integrated communication with the vessel configured to channel a flow of reactant into the vessel; an optional screen positioned transverse to the flow of reactant through the funnel; optionally, a deionizer material positioned at the screen, or in a perforated container, wherein the container is at least partially disposed in the reactant; and an optional door pivotally or slidably mounted over the reactant source.

BRIEF DESCRIPTION OF THE FIGURES

FIG. 6A is a perspective view of a housing cover having a sliding door disposed therein.

DETAILED DESCRIPTION

Figure 2:
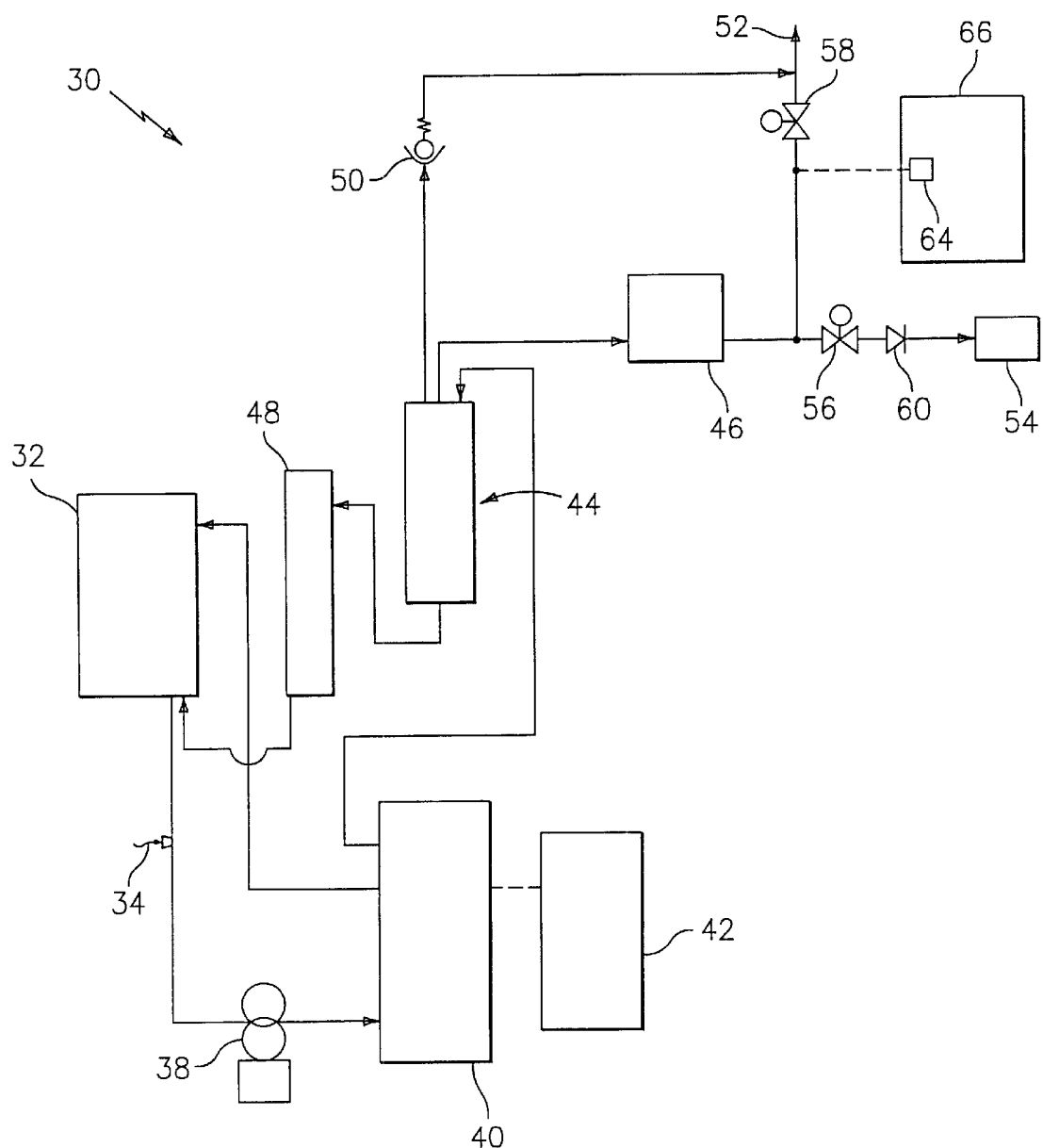
FIG. 2 is a schematic representation of a gas generating system into which an electrolysis cell system may be incorporated.

Referring to FIG. 2, an exemplary embodiment of an electrolysis cell system is shown generally at 30 and is hereinafter referred to as "system 30." System 30 is suitable for generating hydrogen for use in gas chromatography, as a fuel, and for various other applications. It is to be understood that while the inventive improvements described below are described in relation to an electrolysis cell, the improvements are generally applicable to both electrolysis and fuel cells. Furthermore, although the description and figures are directed to the production of hydrogen and oxygen gas by the electrolysis of water, the apparatus is applicable to the generation of other gases from other reactant materials.

Exemplary system 30 includes a water-fed electrolysis cell capable of generating gas from reactant water and is operatively coupled to a control system. Suitable reactant water is deionized, distilled water and is continuously supplied from a water source 32. The reactant water utilized by system 30 is stored in water source 32 and is fed by gravity or pumped through a pump 38 into an electrolysis cell stack 40. The supply line, which is preferably clear plasticizer-free tubing, includes an electrical conductivity sensor 34 disposed therewithin to monitor the electrical potential of the water, thereby determining its purity and ensuring its adequacy for use in system 30.

Figure 1:
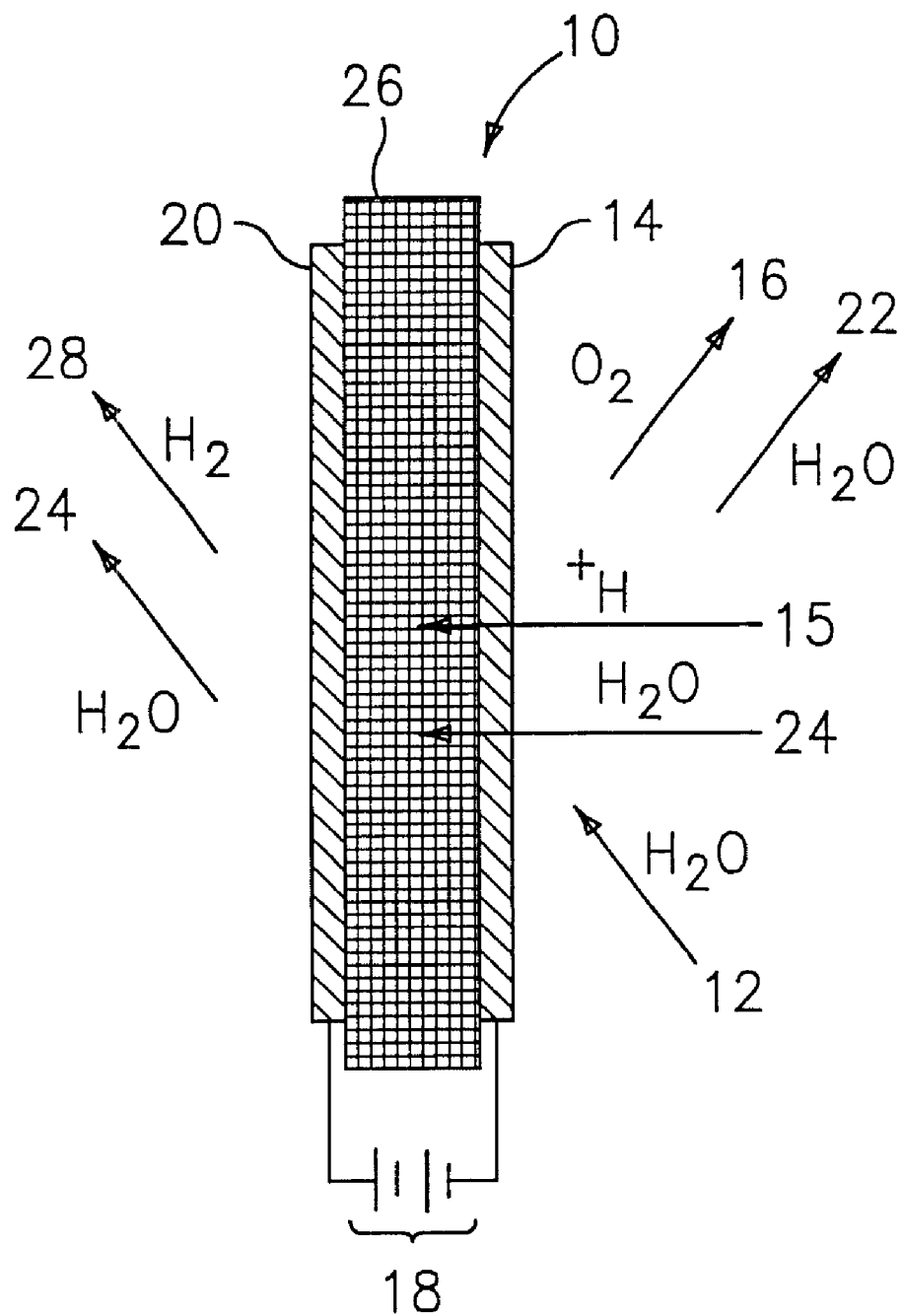
FIG. 1 is a schematic representation of an anode feed electrolysis cell of the prior art.

Cell stack 40 comprises a plurality of cells similar to cell 10 described above with reference to FIG. 1 encapsulated within sealed structures (not shown). The reactant water is received by manifolds or other types of conduits (not shown) that are in fluid communication with the cell components. An electrical source 42 is disposed in electrical communication with each cell within cell stack 40 to provide a driving force for the dissociation of the water.

Oxygen and water exit cell stack 40 via a common stream and are ultimately returned to water source 32, whereby the water is recycled and the oxygen is vented to the atmosphere. The hydrogen stream, which contains water, exits cell stack 40 and is fed to a phase separation tank, which is a hydrogen/water separation apparatus 44, hereinafter referred to as "separator 44" where the gas and liquid phases are separated. This hydrogen stream has a pressure that is preferably about 250 pounds per square inch (psi), but which may be anywhere from about 1 psi to about 6000 psi. Some water is removed from the hydrogen stream at separator 44. The exiting hydrogen gas (having a lower water content than the hydrogen stream to separator 44) is further dried at a drying unit 46, which may be, for example, a diffuser, a pressure swing absorber, or desiccant. Water with trace amounts of hydrogen entrained therein is returned to water source 32 through a low pressure hydrogen separator 48. Low pressure hydrogen separator 48 allows hydrogen to escape from the water stream due to the reduced pressure, and also recycles water to water source 32 at a lower pressure than the water exiting separator 44. Separator 44 also includes a release 50, which may be a relief valve, to rapidly purge hydrogen to a hydrogen vent 52 when the pressure or pressure differential exceeds a preselected limit.

Pure hydrogen from diffuser 46 is fed to a hydrogen storage 54. Valves 56, 58 are provided at various points on the system lines and are configured to release hydrogen to vent 52 under certain conditions. Furthermore, a check valve 60 is provided that prevents the backflow of hydrogen to diffuser 46 and separator 44.

A ventilation system (not shown) is provided to assist in venting system gases when necessary. The ventilation system comprises a fan portion that continually purges the air in the enclosure of system 30. An airflow switch is mounted on the fan portion and is configured to interrupt the power to cell stack 40 in the event of a failure in the fan portion, thereby halting the production of hydrogen gas.

A hydrogen output sensor 64 is incorporated into system 30. Hydrogen output sensor 64 may be a pressure transducer that converts the gas pressure within the hydrogen line to a voltage or current value for measurement. However, hydrogen output sensor 64 can be any suitable output sensor other than a pressure transducer, including, but not limited to, a flow rate sensor, a mass flow sensor, or any other quantitative sensing device. Hydrogen output sensor 64 is interfaced with a control unit 66, which is capable of converting the voltage or current value into a pressure reading. Furthermore, a display means (not shown) may be disposed in operable communication with hydrogen output sensor 64 to provide a reading of the pressure, for example, at the location of hydrogen output sensor 64 on the hydrogen line. Control unit 66 is any suitable gas output controller, such as an analog circuit or a digital microprocessor.

Figure 3:
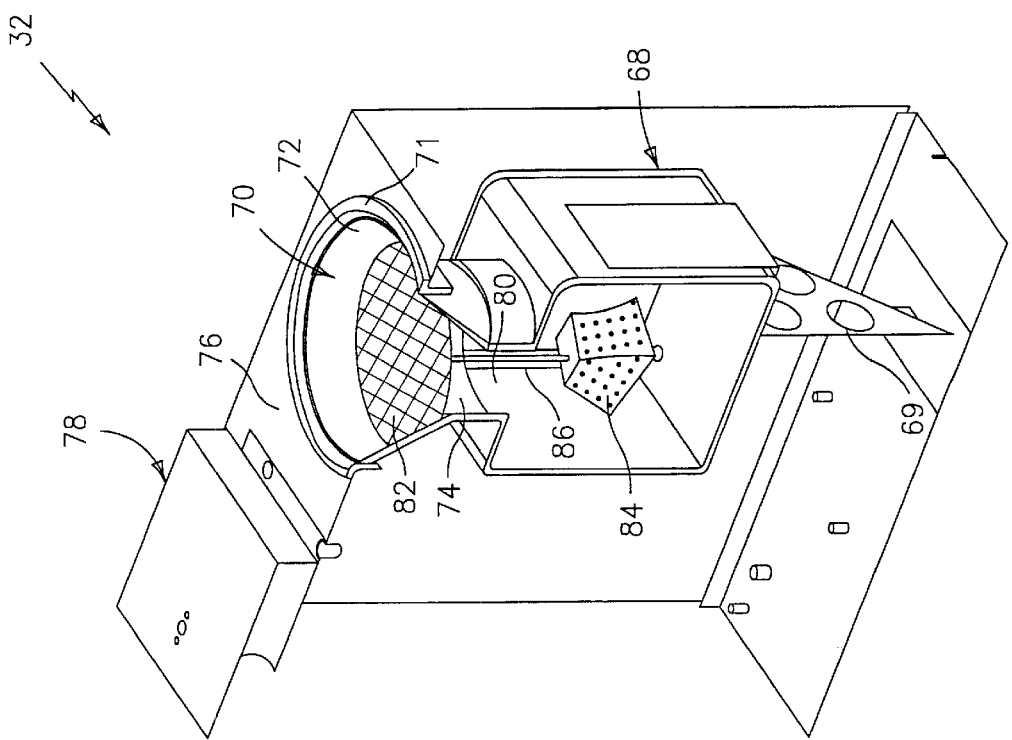
FIG. 3 is a perspective cutaway view of a water source for an electrolysis cell system having a funnel integrated therein to facilitate the pouring of water into the water source.

Referring now to FIG. 3, an exemplary embodiment of water source 32 and its associated componentry are shown as they would be mounted within a housing 78 of the electrolysis cell system. Water source 32 comprises a vessel portion, shown generally at 68, and a funnel, shown generally at 70, disposed in integrated and contiguous communication with vessel portion 68. Vessel portion 68 is supported by a bracket 69 mounted within housing 78. Funnel 70 is a frustoconically-shaped member having a wider mouth portion 72 (inlet) and a narrower outlet portion 74 (outlet). Wider mouth portion 72 is positioned to receive a water flow therein, and narrower outlet portion 74 is positioned to channel the water flow into vessel portion 68. The surfaces of funnel 70 adjacent wider mouth portion 72 are made contiguous with a surface 76 disposed over water source 32 by the mounting of a sealing ring 71 over the interface of wider mouth portion 72 and surface 76. The mounting of sealing ring 71 prevents the leakage of water into the componentry of the cell system during the filling of water source 32. The surfaces of funnel 70 adjacent narrower outlet portion 74 are made integral with the surfaces that define opening 80 using a joining technique such as welding or brazing. Such a joining technique to make the surfaces of funnel 70 contiguous with the surfaces that define opening 80 further prevents the leakage of water into the cell system. Alternately, funnel 70 may be molded or cast with vessel portion 68, thereby making vessel portion 68 and funnel 70 a unitary element.

Also shown in FIG. 3 is a screen 82 positioned in funnel 70 so as to be transversely positioned to the flow of water through funnel 70. Screen 82 rests in funnel 70 at a point between wider mouth portion 72 and narrower outlet portion 74 and comprises a mesh material that is about 50% open. The mesh material prevents the passage therethrough of larger contaminants, debris, and various other objects such as small tools. Screen 82 is generally fabricated from an inert metal such as stainless steel or an inert plastic such as polycarbonate.

A perforated container, e.g. mesh bag 84 having a deionizer (not shown) retained therein depends from screen 82 by a string 86. String 86 is defined by an elongated member having retaining elements (not shown) disposed on opposing ends. The retaining elements are generally configured to prevent the elongated member from being easily removed from the mesh of screen 82 and from being easily removed from deionizer resin bag 84. The elongated member is dimensioned to allow deionizer resin bag 84 to hang into water source 32 below the water level when water source 32 is either full or near full. The hanging weight of deionizer resin bag 84 provides sufficient force to anchor screen 82 in funnel 70. Materials from which deionizer resin bag 84 and string 86 may be fabricated include, but are not limited to, polytetrafluoroethylene, polyethylene, and polypropylene.

The deionizer material retained within deionizer resin bag 84 is an ion exchange material that reacts with (and adsorbs) ionic impurities in the water. The resin furthermore recombines hydrogen protons with oxygenated water to form more water. Suitable ion exchange materials include, for example, AMBERLITE® IRN150 available from Rohm and Haas Company, Philadelphia, Pa. Upon replacement of the ion exchange as needed, e.g. annually, the operator removes screen 82 from funnel 70 and inserts a new string through the mesh of screen 82.

Figure 4:
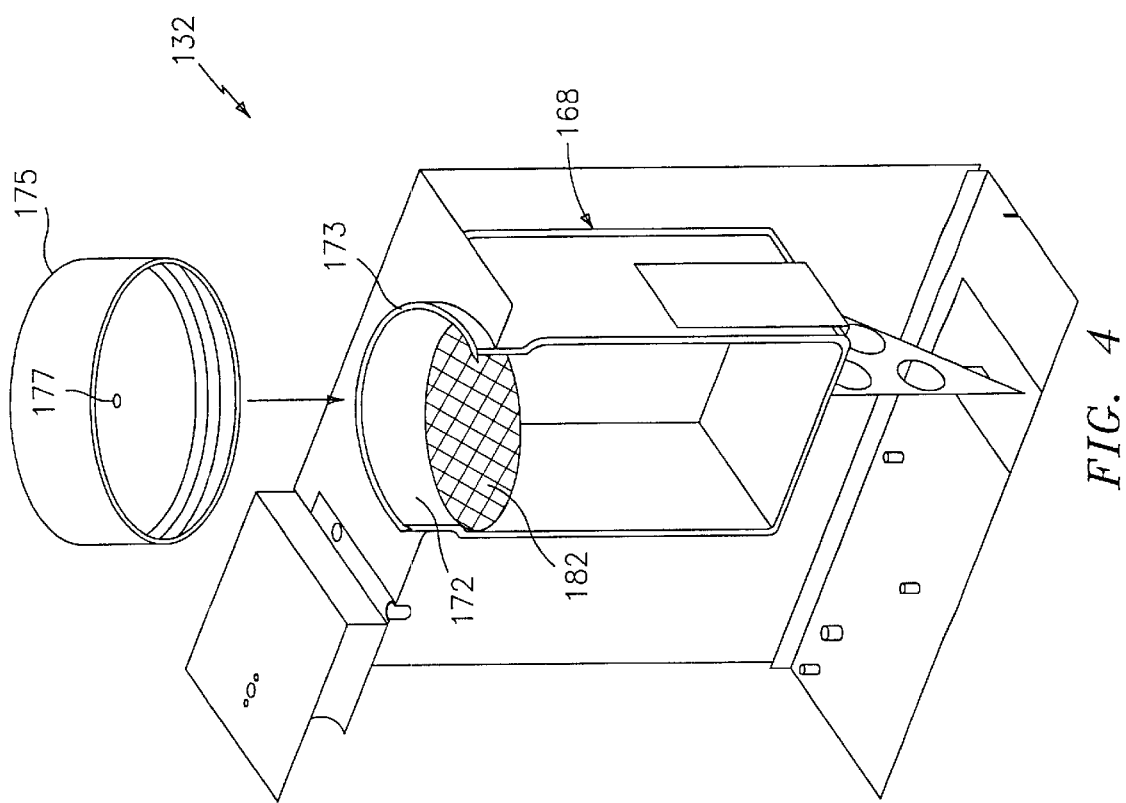
FIG. 4 is a perspective cutaway view of an alternate embodiment of a water source having a wide mouth and a rim configured to threadedly receive a cap.

Referring now to FIG. 4, an exemplary embodiment of an alternate water source is shown generally at 132. Water source 132 comprises a vessel portion, shown generally at 168, having an opening 172 disposed therein for receiving a "drop-in" funnel/screen/deionizer bag assembly (not shown) or simply a screen 182 and a deionizer resin bag (not shown). Opening 172 is defined by a mouth having a rim portion 173 that is threaded to threadedly receive a cap 175. Cap 175 includes a hole 177 disposed therein such that when cap 175 is threadedly received over opening 172, vapor communication is maintained through hole 177, thereby minimizing or eliminating the chance that vapor lock will be encountered during operation of the cell system.

Figure 5:
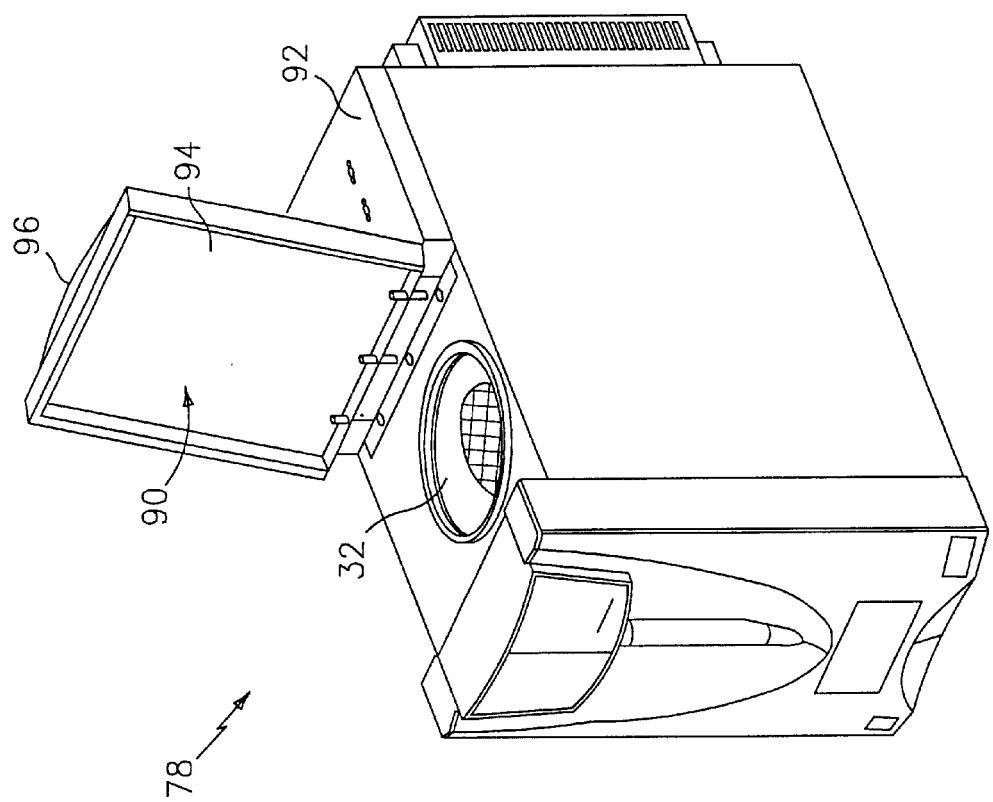
FIG. 5 is a perspective view of a housing having a hinged door shown in the open position over a funnel.

Referring now to FIG. 5, housing 78 is shown. Housing 78 includes a door, shown generally at 90, pivotally connected to an outer shell 92. Door 90 is configured so as not to provide an airtight seal over water source 32, thereby allowing oxygen in the water in water source 32 to be vented to the atmosphere. Door 90 comprises a planar member 94 hingedly attached along one edge to outer shell 92 and includes a finger grip 96 disposed at an edge thereof to facilitate the opening of door 90. In addition, planar member 94 may be dimensioned so as to be frictionally retained in the closed position in order to prevent the inadvertent opening of door 90.

Door 90 functions to minimize the introduction of dust or particulate matter into the water source by moving the dust or particulate matter away from the funnel during the opening of door 90. In particular, by lifting door 90 and causing it to pivot along the edge that is hingedly attached to outer shell 92, any foreign object (not shown) resting on door 90 is biased away from funnel 70. During the opening of door 90, door 90 serves as a shield to prevent the foreign object from being blown back into funnel 70.

Figure 6B:
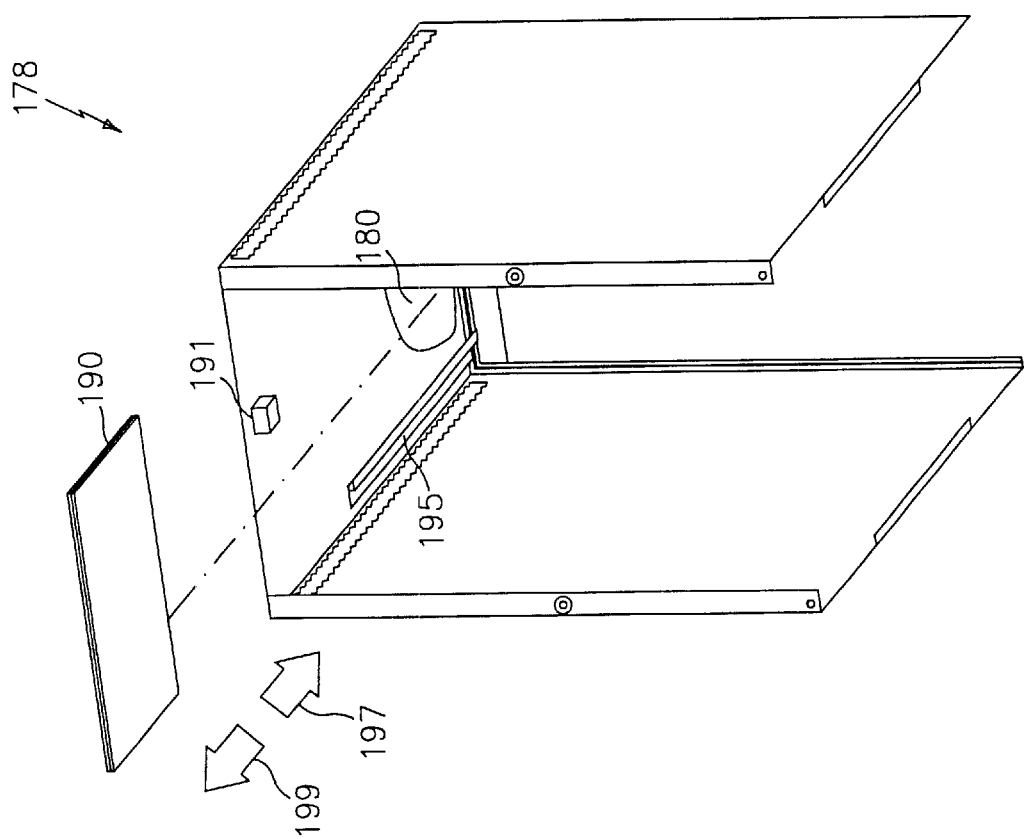
FIG. 6B is a perspective view of the inside of a housing cover having a sliding door disposed therein.

In FIGS. 6A and 6B, an alternate exemplary embodiment of a housing is shown generally at 178. Housing 178 is similar to housing 78 as was illustrated with reference to FIGS. 3 through 5; however, housing 178 includes a port 180 disposed in the surface of housing 178 to allow access to be gained to a water source mounted within housing 178. Although port 180, as shown, is defined by a straight edge 181 extending parallel to an edge of housing 178 and an arcuately formed edge 183 to form an opening shaped substantially like the letter "D," it should be understood by those of skill in the art that port 180 can be configured to be any shape that enables the operator of the cell system to gain access to the interior of housing 178. Vent holes 181 are further disposed in housing 178 such that the componentry of the cell system enclosed by housing 178 can be properly ventilated.

Housing 178 includes a door, shown generally at 190, slidably disposed within housing 178 such that port 180 can be effectively closed off, thereby preventing access to the water source. Door 190 comprises a planar member 194 supported on opposing sides by opposingly-oriented tracks, one of which can be seen at 195 in FIG. 6B. Tracks 195 are tack welded to an inner surface of housing 178 (or attached thereto using a similar means of attachment) such that door 190 can be received therebetween and can slide in opposing directions to either register with port 180 or be retained under housing 178. Door 190 includes a finger grip 196 disposed at an edge thereof to facilitate the grasping and sliding of door 190 by the operator.

The sliding of door 190 in the directions indicated by arrows 197 and 199 effectuates the closing and opening of door 190. Once door 190 is slidably mounted in tracks 195, a bumper 191 mounted on the inner surface of housing 178 prevents door 190 from sliding too far into the open position. Bumper 191 may be fabricated of rubber or a similar elastomeric material and is mounted on the inner surface of housing 178 adhesively or with any type of fastening device.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A gas generating system, comprising:
   an electrolysis cell;
   an electrical source disposed in communication with said electrolysis cell;
   a reactant source disposed in fluid communication with said electrolysis cell, said reactant source comprising,
      a vessel, and
      a funnel disposed in integrated communication with said vessel, and being configured to channel a flow of reactant into a portion of said vessel.

2. The gas generating system of claim 1 further comprising a screen positioned in said funnel, said screen being positioned transverse to the flow of reactant through said funnel.

3. The gas generating system of claim 2 further comprising a deionizer material disposed at said screen.

4. The gas generating system of claim 3 wherein said deionizer material is disposed in a bag depending from said screen.

5. The gas generating system of claim 1 further comprising a door disposed over said reactant source.

6. The gas generating system of claim 5 wherein said door is pivotally mounted over said reactant source.

7. The gas generating system of claim 5 wherein said door is slidably mounted over said reactant source.

8. A hydrogen gas generator, comprising:
   a proton exchange membrane electrolysis cell; and
   a water source disposed in fluid communication with said proton exchange membrane electrolysis cell, said water source comprising
      a vessel,
      a funnel disposed in integrated communication with said vessel and being configured to channel a flow of water into said vessel portion,
      a screen positioned within said funnel, said screen being positioned to filter particulate matter from the flow of water through said funnel, and
      a deionizer material disposed at said screen.

9. The hydrogen gas generator of claim 8 wherein said deionizer material is disposed in a perforated container depending from said screen.

10. The hydrogen gas generator of claim 8 further comprising a door disposed over said water source.

11. The hydrogen gas generator of claim 10 wherein said door is pivotally mounted over said water source.

12. The hydrogen gas generator of claim 10 wherein said door is slidably mounted over said water source.

13. A gas generating system, comprising:
   an electrolysis cell;
   an electrical source disposed in communication with said electrolysis cell; and
   a reactant source disposed in fluid communication with said electrolysis cell, said reactant source comprising a Vessel, a funnel disposed in integrated communication with said vessel, said funnel being configured to channel a flow of reactant into said vessel, a screen positioned in said funnel, and a deionizer material disposed in a bag depending from said screen.

* * * * *